United States Patent
Gasquet (10) Patent No.: US 7,419,287 B2
(45) Date of Patent: Sep. 2, 2008

(54) LIGHTING OR INDICATOR DEVICE, IN PARTICULAR FOR MOTOR VEHICLES

(75) Inventor: Jean-Claude Gasquet, Saint Clement (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/458,218

(22) Filed: Jul. 18, 2006

(65) Prior Publication Data
US 2007/0019429 A1    Jan. 25, 2007

(30) Foreign Application Priority Data
Jul. 21, 2005    (FR) ................... 05 07786

(51) Int. Cl.
*F21V 13/04*    (2006.01)
(52) U.S. Cl. .................. 362/511; 362/545; 362/555
(58) Field of Classification Search ................ 362/454, 362/245, 246, 511, 600, 551, 555, 268
See application file for complete search history.

(56) References Cited

U.S. PATENT DOCUMENTS

| 1,469,690 | A  |   | 10/1923 | Smith |
| 1,814,669 | A  |   | 7/1931  | Cushing |
| 2,755,374 | A  |   | 7/1956  | Ott et al. |
| 5,594,424 | A  |   | 1/1997  | Louy et al. |
| 6,356,394 | B1 | * | 3/2002  | Glienicke ................ 359/641 |
| 6,464,366 | B1 | * | 10/2002 | Lin et al. ................ 362/616 |
| 6,540,387 | B2 |   | 4/2003  | Hashiyama et al. |
| 6,929,390 | B2 | * | 8/2005  | Amano ................ 362/545 |
| 7,128,431 | B2 | * | 10/2006 | Ludewig et al. ............. 362/26 |
| 7,160,010 | B1 | * | 1/2007  | Chinniah et al. ........... 362/511 |
| 7,182,497 | B2 | * | 2/2007  | Lee et al. ................ 362/555 |
| 2004/0012976 | A1 |   | 1/2004  | Amano |
| 2005/0063169 | A1 |   | 3/2005  | Erber |

FOREIGN PATENT DOCUMENTS

| DE | 1167773   | 4/1964  |
| DE | 1472500   | 5/1969  |
| DE | 19930461  | 1/2001  |
| DE | 10309451  | 9/2004  |
| DE | 40308704  | 11/2004 |
| DE | 10336162  | 2/2005  |
| EP | 1110817   | 6/2001  |
| EP | 1150060   | 10/2001 |
| FR | 2680859   | 3/1993  |
| FR | 2831647   | 5/2003  |
| FR | 2858682   | 2/2005  |

\* cited by examiner

*Primary Examiner*—Anabel M Ton
(74) *Attorney, Agent, or Firm*—Jacox, Meckstroth & Jenkins (57) ABSTRACT

This invention relates to a lighting or indicator device, in particular for motor vehicles, comprising at least one light source and at least one output optical system in order to form a lighting or indicator lamp beam consistent with regulations. In accordance with this invention the device comprises at least one input optical system comprising a collimating element receiving light rays emitted by the source and transmitting a beam of parallel rays towards an output optical system which forms a lighting or indicator lamp beam.

18 Claims, 7 Drawing Sheets

LIGHTING OR INDICATOR DEVICE, IN PARTICULAR FOR MOTOR VEHICLES

BACKGROUND OF THE INVENTION

I. Field of the Invention

This invention relates to lighting or indicator devices intended for motor vehicles in particular. Lighting devices mainly comprise the lamps for dipped, main, fog or running lamps, and the indicator lamps mainly comprise position lamps, direction change indicator lamps, braking indicator lamps, reversing lamps, and rear fog lamps.

In order to simplify location of these various devices on a vehicle it is normal practice to group several together in a single housing, which in particular makes it easier to install them on the vehicle, and to connect them to the vehicle's electrical loom using a single connector provided with an appropriate number of terminals.

Each function generally incorporates a light source, a reflector reflecting the light rays emitted by the source in a general direction of emission, and possibly an enclosing glass, also called an indicator, which may or may not contribute to formation of the light beam, these various components being designed to provide a lighting or indicator beam whose geometrical and photometric characteristics must comply with various regulations. The glass enclosing the housing or indicator is generally common to all the devices present in the same housing.

Each function thus requires a minimum space for location within the individual lighting or indicator device. However the volume available for locating lighting or indicator devices both at the front and rear of a modern motor vehicle is increasingly smaller. In fact the constraints of aerodynamics and stylistic design lead to shapes which are often very different from those which would result from technical considerations alone.

It follows that in many cases three constraints apply simultaneously to the designers of lighting or indicator devices:

i) the light beams must be emitted parallel to the longitudinal axis of the vehicle, ii) the glass enclosing the housing must have a shape which may at the same time be highly curved and highly inclined in relation to the vertical, and iii) the volume available within the housing for locating the various optical systems is relatively small.

It is possible to provide lighting or indicator devices in which the light sources, such as electroluminescent diodes, are positioned on a flat surface, with or without a reflector, and with or without diffusing screens, regardless of the external shape of the lighting or indicator device or its enclosing glass. Although such a design is of low cost, it is unable to provide lighting or indicator devices whose styling is suitable for modern vehicles.

Furthermore, if it is desired for example to provide an indicator lamp which is curved in at least one direction, it is generally provided that the light sources are arranged in such a way that the electroluminescent diodes are located in a regular arrangement, i.e. in a matrix of lines and columns when seen from the front. Such design is relatively constricting. Furthermore, if the lighting or indicator device has a curvature in two directions it is in most cases necessary to bend the surface supporting the light sources in two directions, which is relatively complicated.

II. Description of the Related Art

Various solutions have already been suggested in order to overcome these problems. For example a collimating optical component for an indicator lamp which is designed to be associated with a supporting member having electroluminescent diodes incorporating a dorsal surface which acts together with these electroluminescent diodes, the dorsal surface being shaped in steps onto which transverse openings associated with the electroluminescent diodes open, is known from document FR-A-2 680 859.

Such design makes it possible to design a robust optical element, the diodes being located in the appropriate places. They are supported on strips belonging to the supporting member which usually comprises such an indicator lamp. The diodes may also be located as a sandwich between the strips and the steps so that the diodes can be located in the appropriate position, in particular at the focus or optical centre of the openings in the collimating element, despite the awkward shape of the indicator lamp.

It has already been suggested in document EP-A-1 110 817 that an electroluminescent diode power circuit which may have a curved shape, possibly in two different planes, might be constructed instead of a matrix arrangement based on a flat plane. Such a process for the manufacture of an electroluminescent diode power circuit located on planar supports which are parallel to each other comprises the stages of:

determining the relative positions of the supports, determining whether there is a set of planes perpendicular to the supports, which are parallel to each other, each of which passes through at least one support and such that in each plane the supports have corresponding coordinates relating to a first axis perpendicular to the support which vary uniformly with their abscissas along a second axis parallel to the supports and the planes, determining a reference plane parallel to the supports, determining the image of each support by a projection following the same projection axis on the reference plane followed by translation in relation to the second axis by a length equal to the distance of the support along the projection axis, and linking the images by connecting branches located within the reference plane.

This document also discloses a base for a power circuit for electronic components such that electroluminescent diodes, which are for example constructed using the process which has just been mentioned, and comprising supports for components, the base being of flat shape, the supports being located in such a way that it is possible to make cut-outs in the base so that by forming folds which are parallel to each other the base can be given a shape such that the supports are planar and parallel with each other, and at least some supports are intercepted by a single plane parallel to the folds and perpendicular to the supports, are not coplanar.

Such a process is relatively complex to implement, and requires thorough investigation of the location of the lamp to determine the lines for folding the base for its electrical power circuit. It follows that the lighting or indicator devices so obtained offer greater development possibilities for the stylists, but have relatively high costs which restrict their use to top-of-the-range vehicles.

BRIEF SUMMARY OF THE INVENTION

This invention lies within this context and relates to the provision of a lighting or indicator device which can easily have an aspect in three dimensions matching the external geometry of the lighting or indicator device in a simple, inexpensive and reliable way, while retaining the advantages of a plane which is common to two dimensions for attachment of the light sources.

This invention therefore relates to a lighting or indicator device, in particular for motor vehicles, comprising at least two modules each associated with one light source, each module comprising an input optical system comprising a collimating element receiving light rays emitted by the source and transmitting a beam of parallel rays towards an output optical device to form a lighting or indicator beam consistent with regulations, the input optical system and the output optical system being of a single piece, at least one reflecting surface being located in the path of the beam of parallel rays, the light sources being located on the same planar electrical power circuit, and the output optical systems being located in different planes.

In accordance with this invention the planes on which the output optical systems are located form an angle which is not zero with the plane of the electrical power circuit.

According to other features of this invention:
the input optical system and the output optical system are connected by arms,
the reflecting surface is a plane mirror,
the reflecting surface is a planar surface on which the beam of parallel rays undergoes total reflection,
the collimating element is a convergent lens whose focus is located in the vicinity of the light source,
the collimating element is a Fresnel lens,
the output optical system comprises at least one lens element,
the lens element has a complex surface,
the output optical system has a surface on which light rays parallel to the beam undergo total reflection to emerge radially with respect to the optical axis and are reflected in a direction substantially parallel to the optical axis by a reflector,
the reflector comprises a complex surface which ensures horizontal and vertical distribution of the rays which it reflects,
the light source is an electroluminescent diode.

BRIEF DESCRIPTION OF THE ACCOMPANYING DRAWINGS

Other characteristics and advantages of this invention will be clearly apparent from the description which will now be provided of an embodiment provided non-restrictively with reference to the appended drawings in which.

DETAILED DESCRIPTION OF THE PREFERRED EMBODIMENT

Figure 1:
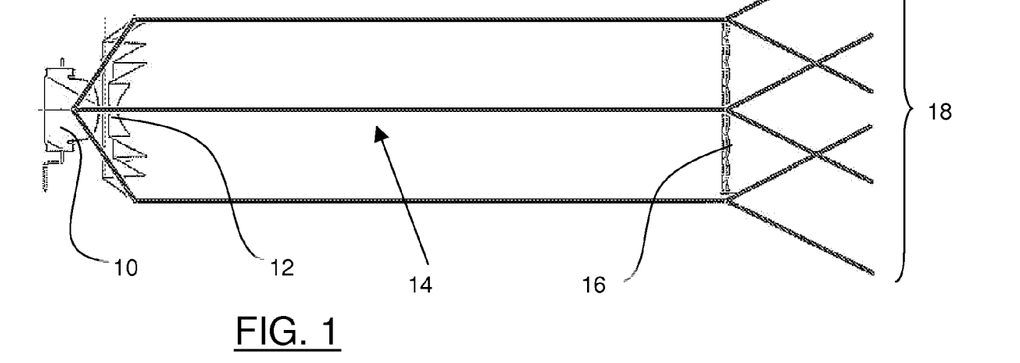
FIG. 1 shows an outline diagram of a lighting or indicator device constructed according to this invention.

By convention in this description "front" relates to the direction in which the light beam emerging from the lighting or indicator device emerges and "rear" indicates the opposite direction. In FIG. 1, the front is therefore to the right and the rear to the left.

FIG. 1 shows an outline diagram of a lighting or indicator device constructed according to this invention. Such a device comprises a light source 10, such as an electroluminescent diode in the example illustrated. The light rays emitted by that source 10 are received by an optical collimating element 12, the focus of which lies in the immediate vicinity of light source 10. The light rays emerging from this collimating element thus form a beam of parallel rays 14. The beam of parallel rays 14 is then received by an optical member 16 forming the lighting or indicator beam 18, comprising output optical system 16.

The collimating element comprising the input optical system may for example be constructed using a convergent lens, for example a Fresnel lens, and the output optical system 16 may comprise an element incorporating one or more lens units, specifically to satisfy the lighting or indicator function required. Light source 10 and the center of the output optical system 16 define the optical axis of the device.

Figure 7:
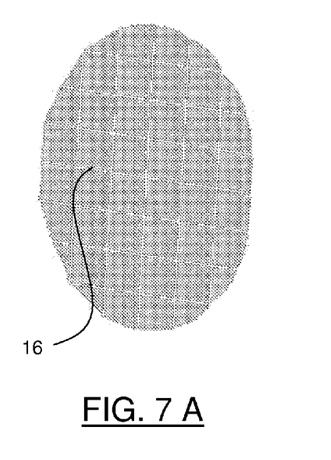
FIGS. 7A, 7B and 7C show examples of output optical devices which can be used in association with the devices in FIG. 1 or 2.

Various embodiments of output optical system 16 are illustrated in FIGS. 7A, 7B and 7C. In FIG. 7A it comprises a grid of lens members, in FIG. 7B it is formed of a central unit of generally square shape surrounded by eight lateral units, and in FIG. 7C it comprises a single lens unit. These units have surfaces which are said to be "complex", subdividing the light beams horizontally and vertically in order to form a photometric grid consistent with regulations.

This invention is thus based on the formation of a light beam of parallel rays between an input optical system associated with a light source and an output optical system bringing about the formation of a lighting or indicator lamp beam consistent with regulations. Through this design, the distance between the input light source and the output surface of the output optical system can be selected at will, giving the path of the beam of parallel rays a desired length so that this distance is no longer subject to the purely optical and geometrical construction design constraints resulting therefrom.

Another result is that it is no longer necessary to design supports for light sources of complex shape, for example curved in two directions at right angles, as in the aforesaid documents. In fact the sources may all be attached to a common flat support, the input optical systems associated with each of these sources being located close to the sources, these input optical systems transmitting parallel light beams in the direction of the output optical systems, which may themselves be located on a surface which is curved in two directions at right angles.

Figure 2:
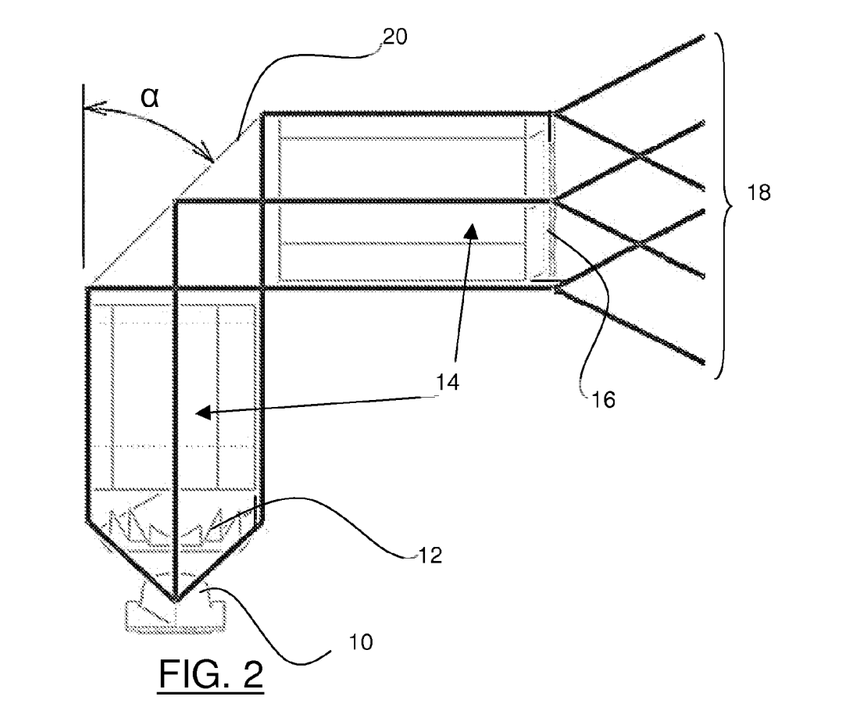
FIG. 2 shows an outline diagram of a lighting or indicator device constructed according to a variant embodiment of this invention.

FIG. 2 shows an outline diagram similar to that in FIG. 1 of a lighting or indicator device constructed in accordance with one variant. This FIG. 2 includes the same elements as in FIG. 1, with the addition of a reflecting surface, for example a plane mirror 20 in the path of parallel light rays 14. As shown in FIG. 2, this plane mirror is inclined at an angle $\alpha$ with respect to the general direction of the parallel light rays transmitted by input optical system 12. As a result the direction of light rays 14 reflected by plane mirror 20 forms an angle $2\alpha$ with the direction of the incident rays on this mirror 20. In the example illustrated in FIG. 2, angle $\alpha$ has a value of approximately 45°, so that beam of parallel rays 14 is diverted through approximately a right angle.

Such a variant offers even more flexibility in the design of a lighting or indicator device according to this invention because light source 10 does not necessarily have to be located on the axis of the output optical device 16.

Various embodiments may be envisaged for the devices in FIG. 1 or 2. In accordance with the first embodiment the input optical system 12 is of one piece with output optical system 16. The volume between input optical system 12 and output optical system 16 is thus formed of the same transparent material as the input and output optical system 16. The lighting or indicator device is thus constructed of a single three-dimensional optical component forming a monobloc module whose transverse cross-section will be advantageously circular, but may also be of a polygonal shape, preferably symmetrical with respect to the optical axis of the device.

The transparent material used may for example comprise polycarbonate (PC) or polymethylmethacrylate (PMMA), or again glass.

In this embodiment the input and output optical systems are formed on the extreme surfaces of the volume. The collimating element comprising the input optical system may for example be formed through a concave shape imparted to the surface opposite the light source. It may also be formed by concentric circular grooves comprising a Fresnel lens, depending on the reflective index of the material comprising the device.

Such an embodiment has the advantage that it avoids light losses through parasitic reflections on the input and output surfaces of the input and output optical systems.

In the case of the variant in FIG. 2, plane mirror 20 is obtained through a planar surface on which light rays 14 undergo total reflection within the material. It is therefore necessary that the angle $\alpha$ which that planar face forms with the optical axis of the input optical system must be greater than the limiting angle for total reflection, that is the Brewster angle, which depends on the refractive index of the material used to form the device and the refractive index of the medium within which that material is immersed, generally atmospheric air, the refractive index of which is through convention equal to unity. In the case of the materials mentioned above, this limiting angle is equal to approximately 40 degrees in the case of polycarbonate (PC) or approximately 43 degrees in the case of polymethylmethacrylate (PMMA).

Figure 3:
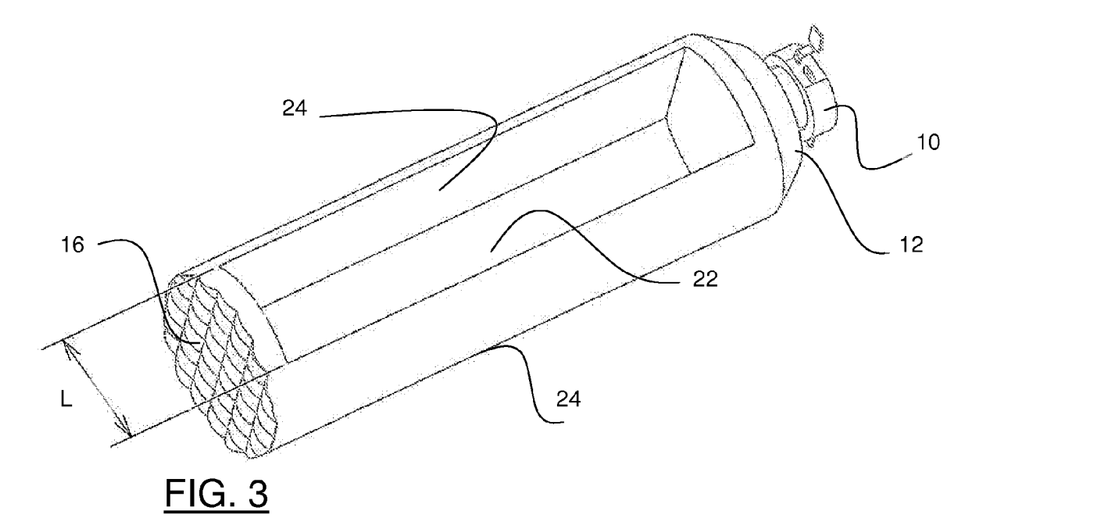
FIG. 3 shows an isometric perspective view of the lighting or indicator device in FIG. 1.

In accordance with the second embodiment, the input 12 and output 16 optical systems are separated and separate from one another. The volume between the input 12 and output 16 optical systems thus comprises air. In this case the input and output optical systems may be wholly independent of each other, and each supported by a supporting member which ensures that they have a relatively fixed position, in particular aligned with the optical axis of the device. They may also be located at the extremities of the three-dimensional optical piece in the preceding embodiment, this piece having been hollowed out at 22, as shown in FIG. 3, to form a hollow module.

Void 22 may be formed in any appropriate way, the input and output optical systems being both supported by at least one arm 24, two in the example illustrated, connecting the input and output optical systems. The width L of void 22 is selected to ensure that arms 24 have minimum rigidity. In the example illustrated in FIG. 3, void 22 has the shape of a rectangular parallelepiped, but could have any desired prismatic shape which is preferably symmetrical with respect to the optical axis of the device.

Of course, parallel light rays emerging from input optical system 12 might reach output optical system 16 by passing through the transparent material forming arm or arms 24. Construction of the device according to the invention in the form of a monobloc module as in the first embodiment, or in a hollowed out form as in the second embodiment, thus has no effect on the quantity of light flux reaching output optical system 16.

The advantage of this second embodiment is that it requires less material to obtain the same result as in the first embodiment. A device constructed in this way will therefore be lighter and less costly, while making manufacture easier because when the device provided with such a void is molded, cooling of the material will take place under optimum conditions, and it will therefore be possible to optimize the design of the device according to the invention by for example minimizing the average thickness of arm 24, which tends to bring about better heat exchange during cooling.

Figure 6:
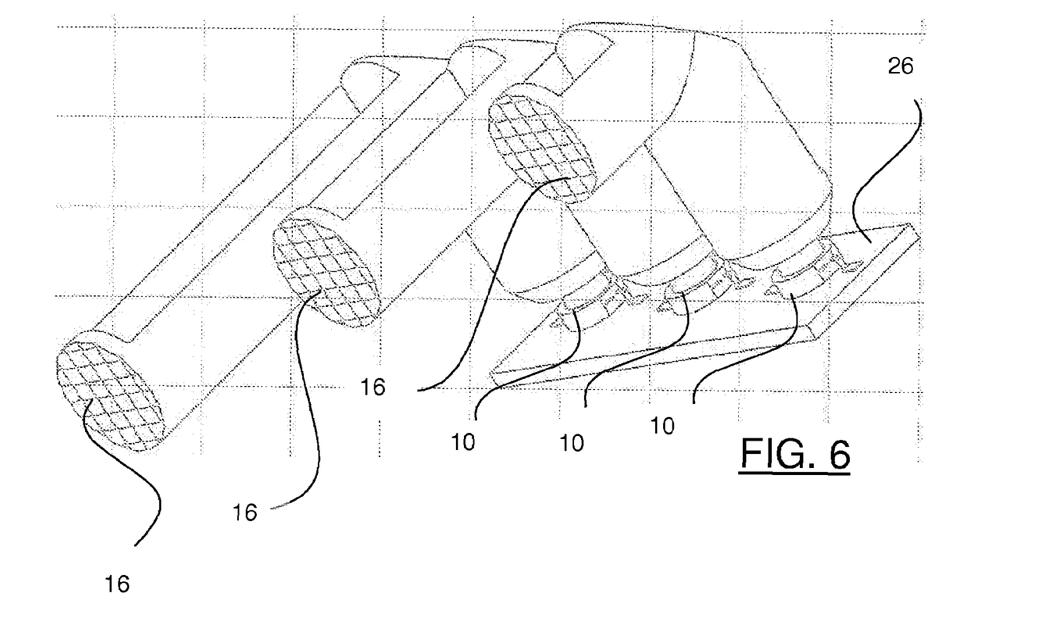
FIG. 6 shows an isometric perspective view of an embodiment of lighting or indicator devices according to FIG. 2.

In the case of the variant in FIG. 2, plane mirror 20 may be regarded as a mirror held between the input and output optical systems. It may also be obtained as in the previous embodiment through a planar surface on which light rays 14 undergo total reflection. Input optical system 12 and the wholly reflecting surface may for example be constructed of a single piece, and then a void may be hollowed out between the wholly reflecting surface and the output optical system as shown in FIG. 6.

Figure 4:
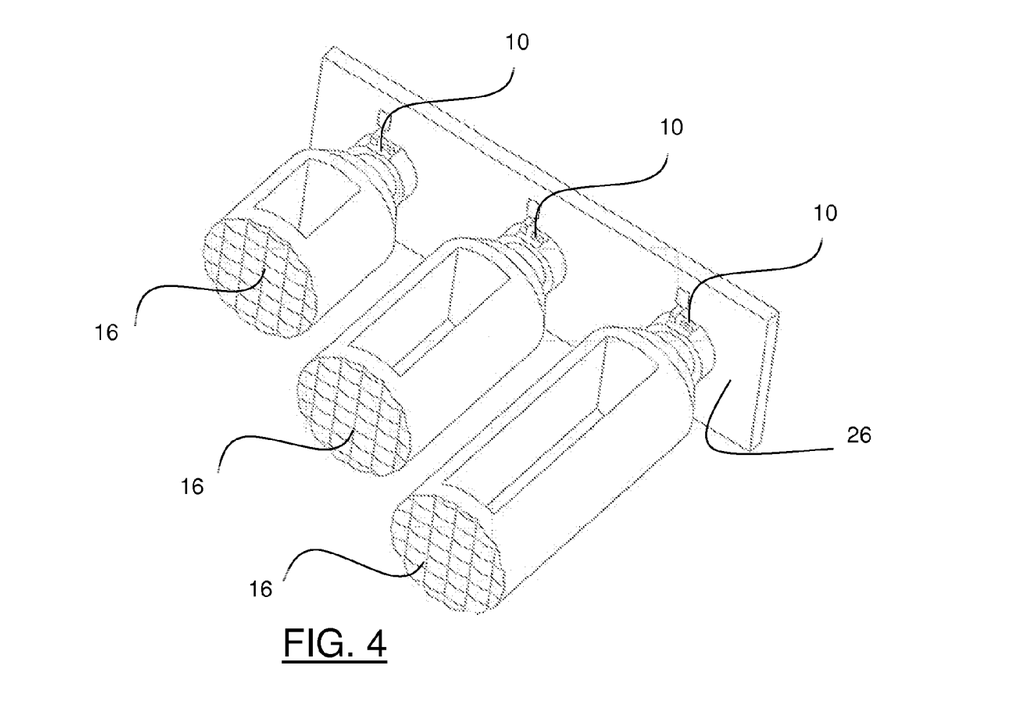
FIG. 4 shows an isometric perspective view of an embodiment of the lighting or indicator devices according to FIG. 1.
Figure 5:
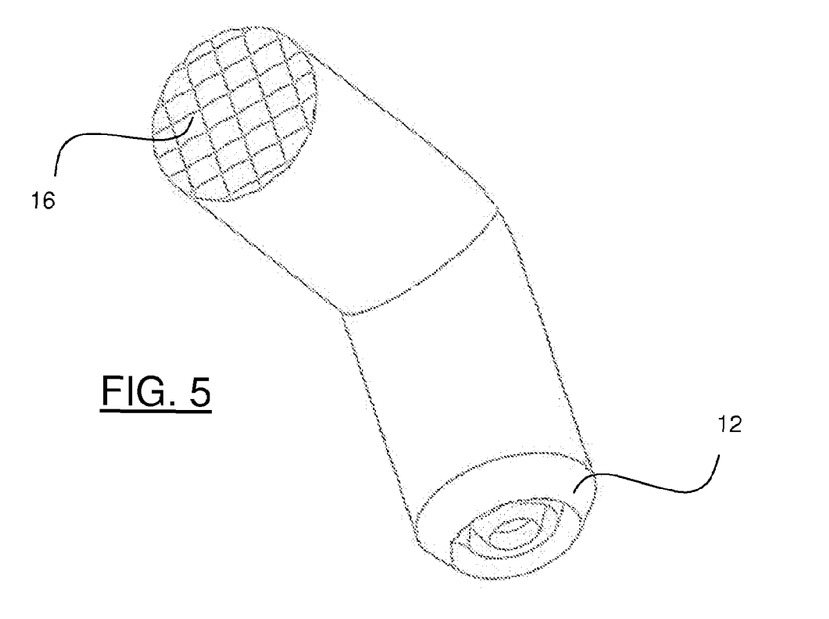
FIG. 5 shows an isometric perspective view of the lighting or indicator device in FIG. 2.

Whatever variant or method of manufacture is selected, several modules as just described may be associated so that they act together to provide the same lighting or indicating function. This is what has been illustrated in FIGS. 4 and 6 for the two variant embodiments. It will be seen that in these figures several illustrative modules, in point of fact three, are associated.

More specifically, light sources 10, electroluminescent diodes in the examples illustrated, are located on the same electrical power circuit 26 which may as a result of the invention be constructed of planar shape. These electroluminescent diodes are each associated with an input optical system located in the vicinity of the electroluminescent diode. As a result of the invention it will be seen that it is possible to place several modules of different length, for example of decreasing length, alongside each other so that output optical systems 16 are located in different planes so as to adjust the lighting or indicating function performed by the set of modules to a non-planar shape of a glass enclosing the housing containing these modules, the shape of this glass being imposed by the motor vehicle stylists or manufacturers.

Output optical systems 16 may thus be located in such a way that they are all in different planes and substantially perpendicular to the general direction in which the lighting or indicator beam is emitted, generally parallel to the longitudinal axis of the vehicle, while the light sources are all located in one plane, which may be inclined or perpendicular with respect to that axis.

Figure 8:
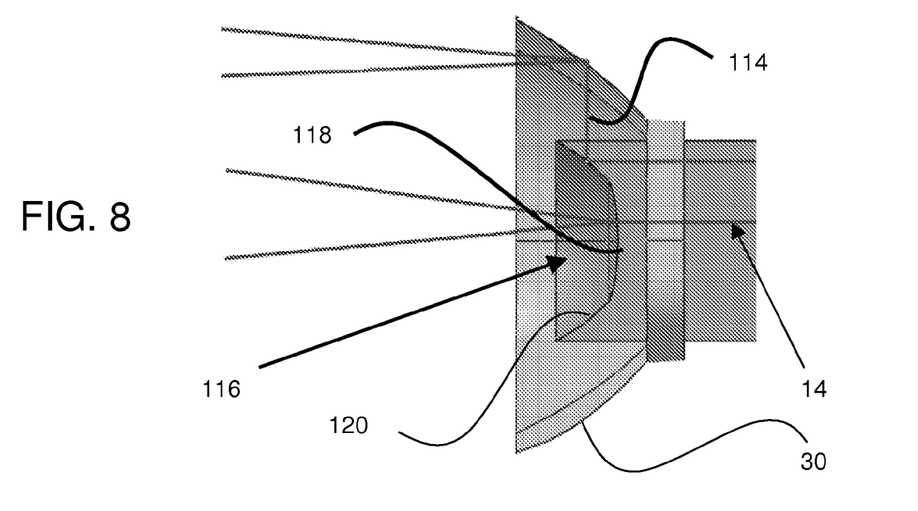
FIG. 8 is a view in cross-section of a second embodiment of an optical member forming the lighting or indicator beam which can be used as an output for the devices illustrated in FIGS. 1 to 6.

FIG. 8 shows a second embodiment of the output optical system comprising a surface 116. This surface 116 has for example a central part 118 through which the parallel light rays of beam 14 pass and is able to distribute the horizontally and/or vertically emerging light beams in the manner of the lens units illustrated in FIGS. 7A, 7B and 7C.

Surface 116 also has an annular portion 120 of an overall frustoconical shape, on which the parallel light rays of beam 14 undergo total reflection to emerge radially with respect to the optical axis of the device according to the invention. These radial rays 114 are incident on a reflector 30, which is of one piece with extremity 116, which in turn reflects them in a direction substantially parallel to the optical axis of the device, as illustrated in FIG. 8.

Figure 9:
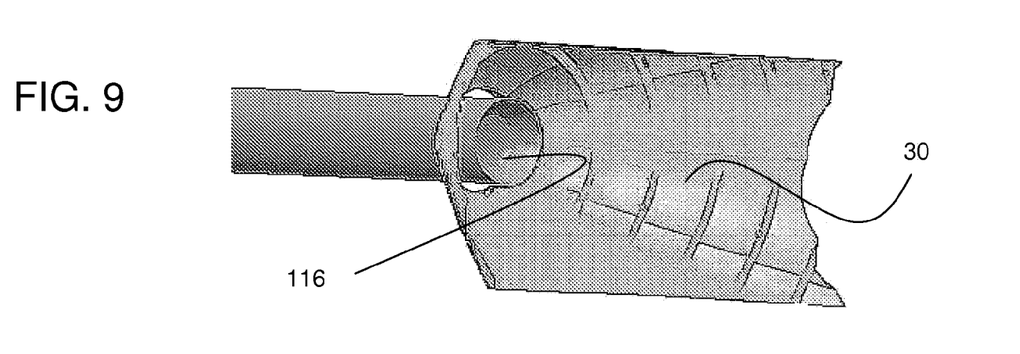
FIG. 9 is an isometric three-quarter front perspective view of the second embodiment in FIG. 8.
Figure 10:
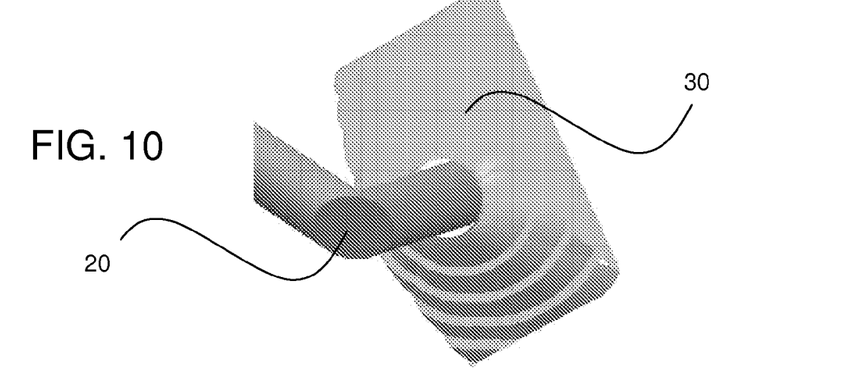
FIG. 10 is a view similar to that in FIG. 9, from the three-quarter rear.

Reflector 30 may advantageously comprise a surface which is described as complex, bringing about horizontal and vertical distribution of the rays which it reflects. FIGS. 9 and 10 show the possible appearance of a lighting or indicator device constructed in accordance with this second embodiment.

As a variant (not shown), it may be provided that surface 116 wholly comprises a conical part such as 120 in order to bring about total reflection of all the rays in beam 14 in a radial direction, no ray in this beam being transmitted directly, no part allowing transmission such as central part 118 being present.

Advantageously the various features of this invention which have just been described may be combined together or duplicated in order to meet a variety of needs.

Figure 11:
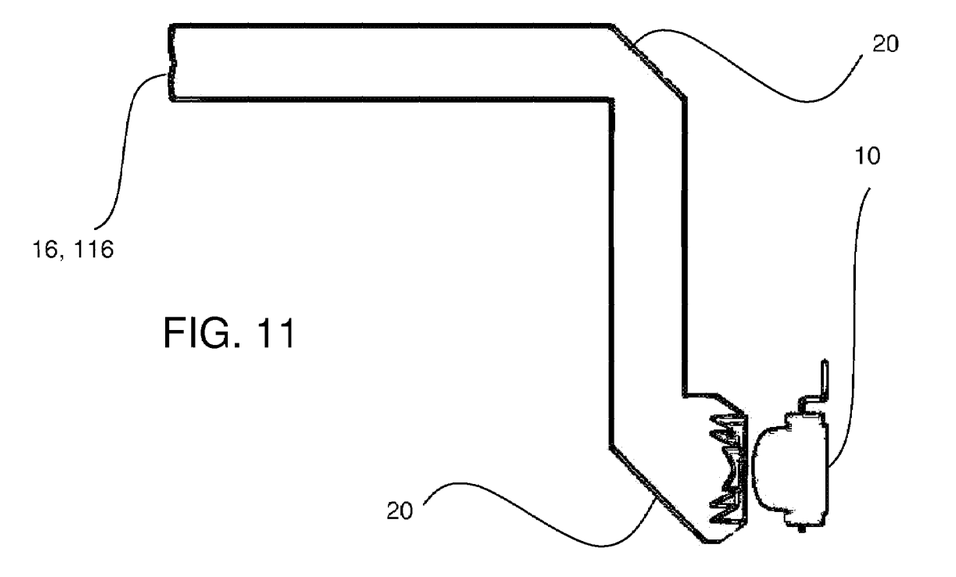
FIG. 11 shows an outline diagram of a lighting or indicator device constructed according to a second embodiment of this invention.

It may for example be provided that the device is equipped with two returning mirrors 20, whether these comprise mirrors per se or wholly reflecting surfaces as described with reference to FIG. 2, to form a device as illustrated in FIG. 11. Such a design offers even more flexibility in the location of light sources 10 such as electroluminescent diodes with respect to the single output surface such as 16, or the surface fitted with a reflector such as 116. These output surfaces may thus be of the type illustrated in FIGS. 7A, 7B and 7C, which themselves ensure distribution of the light rays passing through them, or they may be associated with reflectors illustrated in FIGS. 8 to 10.

Figure 12:
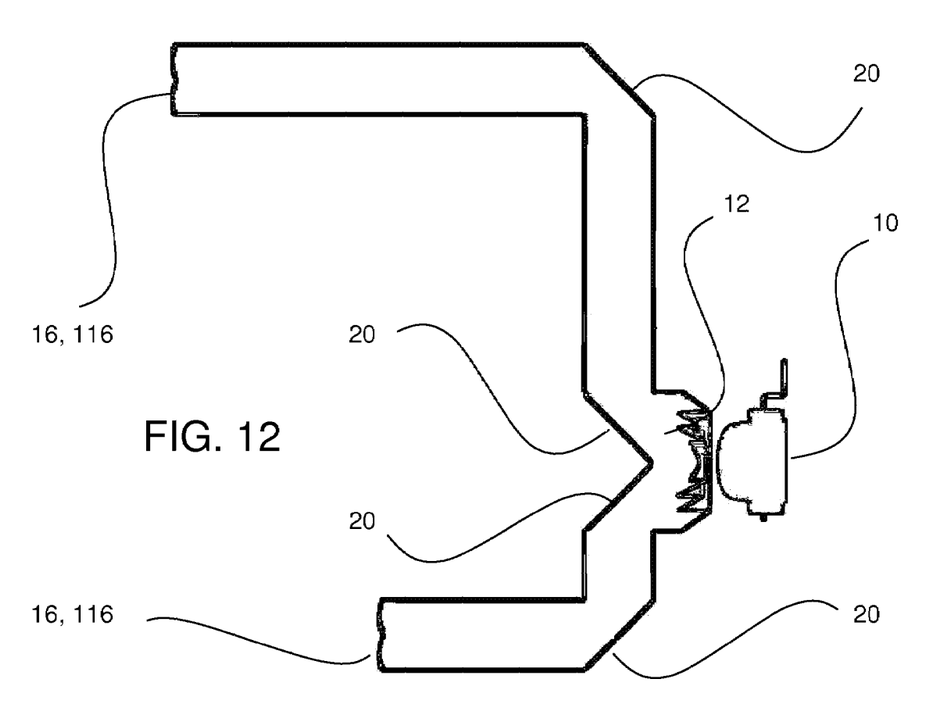
FIG. 12 shows an outline diagram of a lighting or indicator device constructed according to a third variant embodiment of this invention.

It may also be provided that one light source 10 is associated with several devices such as those just described, as illustrated in FIG. 12. In order to put this into effect, return mirrors 20 are located downstream from input optical device 12 in such a way as to distribute a portion of parallel beam 14 formed by input device 12 between several devices such as the one described with reference to FIG. 11.

Figure 13:
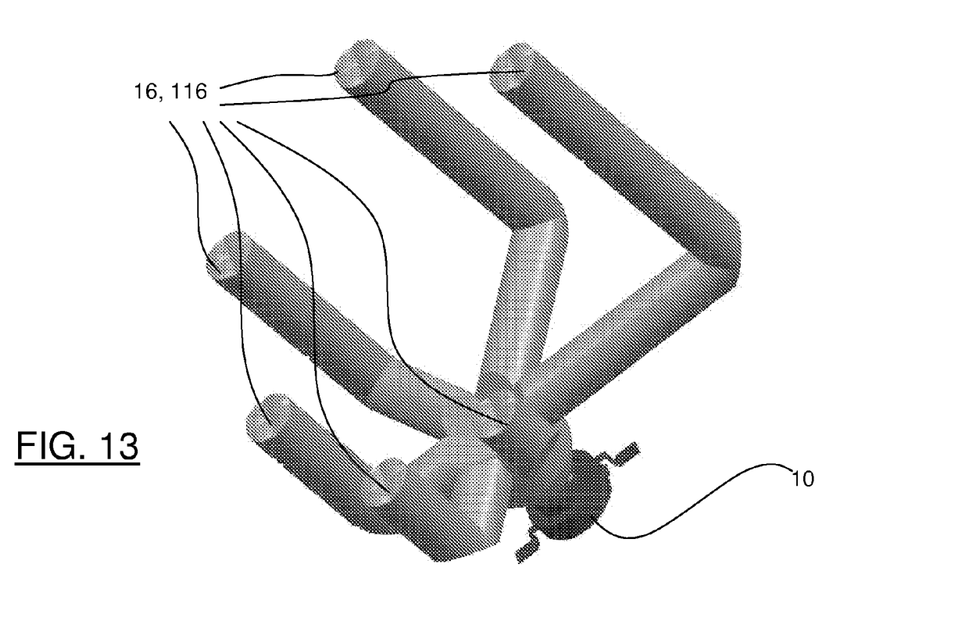
FIG. 13 is an isometric three-quarter front perspective view of a lighting or indicator device embodying the third variant in FIG. 12.

FIG. 12 only shows two devices fed by the same source 10 and the same input optical device 12, but several devices may thus be associated with a single source, as shown in FIG. 13.

The output surfaces of the devices illustrated in FIGS. 12 and 13 may also be of the type of those illustrated in FIGS. 7A, 7B and 7C, themselves ensuring distribution of the light beams passing through them, or they may be associated with reflectors illustrated in FIGS. 8 to 10.

Figure 14:
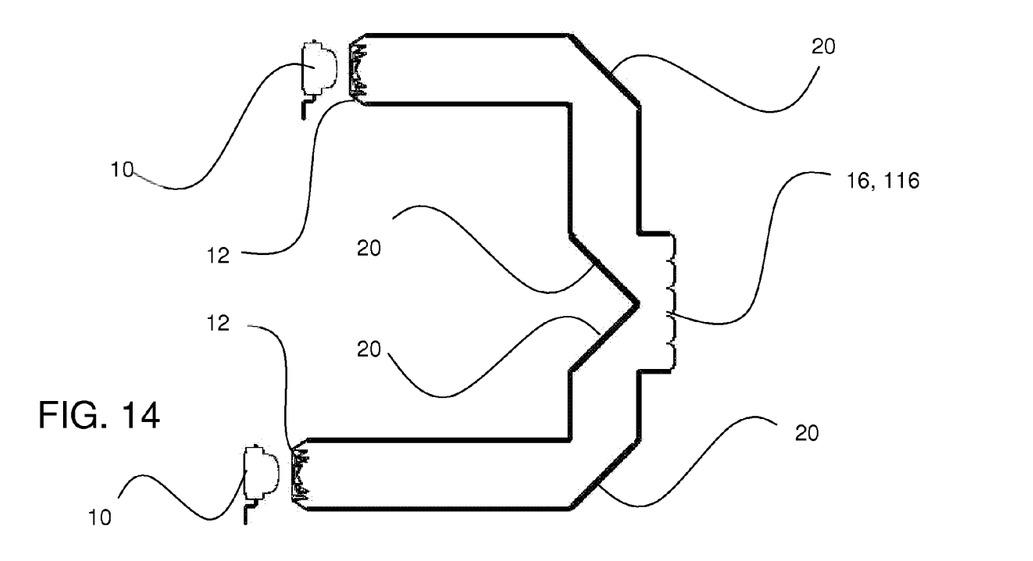
FIG. 14 shows an outline diagram of a lighting or indicator device constructed according to a fourth embodiment of this invention.

Finally, the principle of returning the light back may also be applied, for example in the device in FIG. 12, in order to obtain the device illustrated in FIG. 14, in which several sources are associated with a single output device, whether of the type illustrated in FIGS. 7A, 7B and 7C, which themselves ensure distribution of the light rays passing through them, or they may be associated with a reflector illustrated in FIGS. 8 to 10.

As previously, such design offers great flexibility of location between the light sources, which may be located independently of the output optical system through the formation of parallel intermediate beams, but also makes it possible to obtain a very much greater output light flux using for example six sources for a single output in a device similar to that in FIG. 13, or to obtain different effects by using sources of different colors lit in sequence.

A lighting or indicator device which can be easily adapted to an external envelope which is curved in three dimensions in order to meet aesthetic or aerodynamic requirements is thus achieved in a particularly simple way while retaining all the advantages of a common two-dimensional plane for mounting the light sources.

Of course this invention is not restricted to the embodiments described, and those skilled in the art could on the contrary make may modifications thereto which fall within its scope. Thus for example a parabolic mirror with the light source placed at its focus could be used as the collimating element in the input optical system instead of the dioptric system described.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A lighting or indicator device, in particular for motor vehicles, comprising at least two modules each associated with a light source, each module comprising an input optical system comprising a collimating element receiving light rays emitted by said light source and transmitting a beam of parallel rays to an output optical system to form a lighting or indicator light beam, the input optical system and the output optical system being of a single integral one-piece construction, at least one reflecting surface being located in the path of the beam of parallel rays, the light sources being located on the same planar electrical power circuit, the output optical systems being located in different planes, wherein the planes in which the output optical systems are located form an angle which is not zero with the plane of the electrical power circuit, each of said optical output systems comprising at least one lens unit comprising a complex surface, said complex surface receiving generally parallel light rays and causing said light rays to diffuse away from an axis of said light source when they exit said at least one unit.

2. The lighting or indicator device according to claim 1, wherein said input optical system and said output optical system are connected by arms.

3. The lighting or indicator device according to claim 2, wherein said reflecting surface is a plane mirror.

4. The lighting or indicator device according to claim 1, wherein said reflecting surface is a planar surface on which the beam of parallel rays undergoes total reflection.

5. The lighting or indicator device according to claim 1, wherein said collimating element is a converging lens whose focus is located in the vicinity of the light source.

6. The lighting or indicator device according to claim 5, wherein said collimating element is a Fresnel lens.

7. The lighting or indicator device according to claim 1, wherein said output optical system comprises a surface on which the parallel light rays of the beam undergo total reflection to emerge radially with respect to the optical axis and are reflected by a reflector in a direction substantially parallel to the optical axis.

8. The lighting or indicator device according to claim 7, wherein said complex surface ensures horizontal and vertical distribution of the rays which it reflects.

9. The lighting or indicator device according to claim 1, wherein said light source is an electroluminescent diode.

10. A motor vehicle lighting or indicator device comprising:
- a power circuit;
- a light source comprising a plurality of light emitters coupled to said power circuit and situated in a light source plane; and
- an input optical system comprising a collimating element for receiving light rays emitted by said light source and for transmitting a beam of parallel light rays toward an output optical system;
- said output optical system comprising a plurality of output surfaces that lie in a plurality of planes, respectively, none of said plurality of planes being coplanar with either themselves or said light source plane, said optical output system comprising at least one lens unit comprising a complex surface, said complex surface receiving generally parallel light rays and causing said light rays to diffuse away from an axis of said light source and wherein said input optical system and said output optical system are an integral construction.

11. The motor vehicle lighting or indicator device as recited in claim 10 wherein said plurality of light emitters are light emitting diodes.

12. The motor vehicle lighting or indicator device as recited in claim 10 wherein said plurality of planes are generally parallel.

13. The motor vehicle lighting or indicator device as recited in claim 10 and further comprising:
- at least one reflective surface situated between said input optical system and said output optical system.

14. The motor vehicle lighting or indicator device as recited in claim 13 wherein said at least one reflective surface totally reflects said light beam before it reaches said output optical system.

15. The motor vehicle lighting or indicator device as recited in claim 13 wherein said at least one reflective surface comprises a frusto-conical portion.

16. The motor vehicle lighting or indicator device as recited in claim 11 wherein said light emitting diodes are electroluminescent diodes.

17. A motor vehicle lighting or indicator device comprising:
- a power circuit;
- a light source comprising a plurality of light emitters coupled to said power circuit and situated in a light source plane; and
- an input optical system comprising a collimating element for receiving light rays emitted by said light source and for transmitting a beam of parallel light rays toward an output optical system;
- said output optical system comprising a plurality of output surfaces that lie in a plurality of planes, respectively, none of said plurality of planes being coplanar with either themselves or said light source plane wherein said input optical system and said output optical system are an integral one-piece construction, wherein said integral one-piece construction comprises an opening area situated between said input optical system and said output optical system.

18. The motor vehicle lighting or indicator device as recited in claim 10 wherein said input optical system comprises an input axis and said output optical system comprises an output axis that is not coaxial with said input axis.

* * * * *